United States Patent [19]
Abe

[11] Patent Number: 4,819,968
[45] Date of Patent: Apr. 11, 1989

[54] PIPE JOINT

[75] Inventor: Mitsuji Abe, Ashigarakami, Japan

[73] Assignee: Tannan Co., Ltd., Kanagawa, Japan

[21] Appl. No.: 162,686

[22] Filed: Mar. 1, 1988

[30] Foreign Application Priority Data

Mar. 2, 1987 [JP] Japan .................... 62-28846[U]

[51] Int. Cl.⁴ ............................................. F16L 35/00
[52] U.S. Cl. ........................................ 285/81; 285/321;
  285/343; 285/369; 285/383
[58] Field of Search .............. 285/322, 104, 105, 369,
  285/383, 81, 321, 343

[56] References Cited

U.S. PATENT DOCUMENTS

| | | | |
|---|---|---|---|
| 817,300 | 4/1906 | David | 285/369 X |
| 2,162,184 | 6/1939 | Snyder | 285/364 X |
| 2,283,975 | 5/1942 | Dillon | 285/104 |
| 3,610,666 | 10/1971 | Tyler | 285/369 X |
| 3,653,688 | 4/1972 | Sakakibora | 285/105 |
| 3,944,263 | 3/1976 | Arnold | 285/321 |

*Primary Examiner*—Dave W. Arola
*Attorney, Agent, or Firm*—Birch, Stewart, Kolasch & Birch

[57] ABSTRACT

A pipe joint has a tubular retainer for inserting pipes to be coupled therein, a joint body fitted over the retainer and having a socket holder, and a tubular socket movably disposed around the socket holder. When connecting the pipes to each other, the pipes are inserted into the retainer and positioned therein, the joint body is fitted over the retainer, and the socket holder is brought over the socket holder until the socket is held against a positioning member on the socket holder. A spring in a positioning groove in the socket holder is resiliently displaced radially outwardly partly into a smaller-diameter recess in the socket while partly remaining in the positioning groove, whereupon the socket is retained on the joint body against removal. To disconnect the pipes from each other, the positioning member is removed out of abutment against the socket, and the socket is moved toward a step of the socket holder to cause the spring to be moved from the smaller-diameter recess into a larger-diameter recess contiguous thereto. The spring is now displaced from the positioning groove to disengage the socket from the joint body. The socket is then released from the joint body.

5 Claims, 2 Drawing Sheets

PIPE JOINT

BACKGROUND OF THE INVENTION

1. Field of the Invention

The present invention relates to a pipe joint, and more particularly to a steel pipe joint.

2. Description of Background Art

A conventional steel pipe joint is illustrated in FIG. 4. The steel pipe joint, generally denoted as a, comprises a tubular retainer c with a seal member b fitted therein for positioning the ends of pipes A, B which are inserted from opposite openings in the tubular retainer c and which abut against the seal member b. The steel pipe joint a also includes packing members d, e positioned, respectively, at the opposite ends of the retainer c and fitted over the pipes A, B. The packing members d, e contain steel balls d', e'. The steel pipe joint a has a tubular clamping ring f fitted over the retainer c and the pipe A while forcing the packing member d to be pressed at its inner surface against the end of the retainer c. Another tubular clamping ring g is fitted over the retainer c and the pipe B while forcing the packing member e to be pressed at its inner surface against the other end of the retainer c. The clamping rings f, g and the retainer c have positioning grooves i, h for interfitting the members relative to each other. C-shaped springs j which are resiliently biased radially outwardly are inserted in the positioning grooves h. When the clamping rings f, g are moved a distance toward each other until the positioning grooves i, h are radially aligned, the springs j are resiliently urged to project into the positioning grooves j and are located and engaged in both the positioning grooves i, h. The clamping rings f, g are now fixed with respect to the retainer c.

The pipes A, B can easily be joined to each other by the pipe joint simply by pushing the clamping rings f, g relative to each other with respect to the retainer c.

However, once the pipes A, B have been coupled to each other by the pipe joint, it will be difficult to disconnect the pipes A, B.

For joining the pipes A, B to each other, the clamping ring f may first be coupled to the retainer c. Thereafter, the other clamping ring g may be coupled to the retainer c. If the pipes A, B are out of axial alignment even slightly when coupling the clamping ring g to the retainer c, difficulty then arises in connecting the clamping ring g to the retainer c.

SUMMARY OF THE INVENTION

In view of the aforesaid drawbacks of the conventional pipe joint, it is an object of the present invention to provide a pipe joint capable of connecting and disconnecting pipes with utmost ease.

To achieve the above object, there is provided in accordance with the present invention a pipe joint including a tubular retainer having opposite open ends and including a seal member for positioning the pipes inserted through the open ends by abutting against the pipes. Annular packing members are disposed at opposite ends of said retainer and are adapted to be fitted over the pipes, respectively. A tubular joint body is fitted over the retainer and is adapted to extend axially from one of the pipes to the other pipe. The joint body includes an inner surface for pressing one of the packing members against one of the ends of the retainer. The joint body also includes a socket holder on and around an end thereof remote from the inner surface. The socket holder has a peripheral step and a positioning groove defined fully in a peripheral surface thereof. A positioning member is removably disposed along the step. A spring is disposed in the positioning groove and is normally urged to move radially outwardly. A tubular socket is fitted over the socket holder and is adapted to be disposed around the other pipe. The socket is movable toward the joint body and has an inner surface for pressing the other packing member against the other end of the retainer. The socket includes a smaller-diameter annular recess defined fully in an inner peripheral surface for allowing the spring to be resiliently displaced partly into the smaller-diameter annular recess while partly remaining in the positioning groove when the socket is moved toward the joint body into abutment against the positioning member. A larger-diameter annular recess is disposed contiguous to the smaller-diameter annular recess for allowing the spring to be displaced fully out of the positioning groove when the positioning member is removed and the socket is moved toward the step.

When connecting the pipes to each other, the pipes are inserted into the retainer and positioned by abutting against the seal member. The joint body on one of the pipes is fitted over the retainer, and the socket holder is brought over the other pipe until the socket is held against the positioning member. The spring in the positioning groove is resiliently displaced radially outwardly partly into the smaller-diameter recess in the socket while partly remaining in the positioning groove, whereupon the socket is retained on the joint body against removal.

To disconnect the pipes from each other, the positioning member is removed out of abutment against the socket, and the socket is moved toward the step of the socket holder to cause the spring to be moved from the smaller-diameter recess into the larger-diameter recess. The spring is now displaced from the positioning groove to disengage the socket from the joint body. The socket is then released from the joint body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
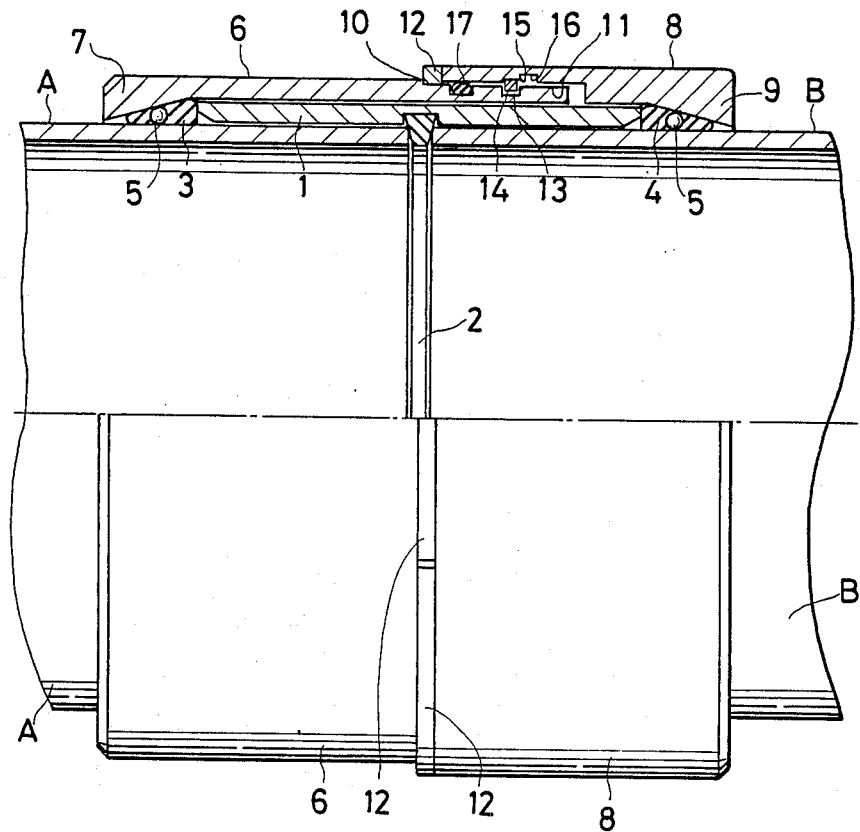
FIG. 1 is a fragmentary cross-sectional view of a pipe joint according to the present invention, the view showing pipes connected to each other by the pipe joint.

FIG. 1 shows a pipe joint according to the present invention in which two pipes A, B are connected to each other. The pipes A, B are inserted into the pipe joint until their inner ends are held in abutment against a seal member 2 positioned centrally on an inner surface of a tubular retainer 1 and inserted in a fully circumferential inner surface of the retainer 1.

Annular packing members 3, 4 are disposed entirely around the pipes A, B, respectively, positioned at the opposite ends of the retainer 1, each of the packing members 3, 4 contain steel balls 5 at spaced intervals along a longitudinal directions of the pipes A, B. A tubular joint body 6 extends axially from outside of the packing member 3 over the pipe A axially onto the pipe B, the tubular joint body 6 being fitted over the retainer 1. The joint body 6 has a smaller-diameter portion 7 having an inner surface slanted radially inwardly over the packing member 3. The smaller-diameter portion 7 and the end of the retainer 1 jointly press and clamp the packing member 3 therebetween. A tubular socket 8 is disposed around the pipe 8 and has a smaller-diameter portion 9 having an inner surface slanted radially inwardly over the packing member 4, the smaller-diameter portion 9 and the other end of the retainer 1 jointly pressing and clamping the packing member 4 therebetween.

A socket holder 11 of a smaller-diameter defined partly by a peripheral step or shoulder 10 is positioned on an end of the joint body 6 remote from the smaller-diameter portion 7. The end of the socket 8 positioned over the retainer 1 can be fitted over the socket holder 11. A removable positioning member 12 is mounted on the socket holder 11 against the step 10. The positioning member 12 is in the form of a pair of C-shaped rings disposed fully along and around the step 10. the socket holder 11 has a positioning groove 13 defined in and along an outer peripheral surface thereof. A spring 14 is removably disposed resiliently in the positioning groove 13. The spring 14 comprises a pair of semicircular C-shaped rings each having a diameter greater than the outside diameter of the socket holder 11.

Figure 3:
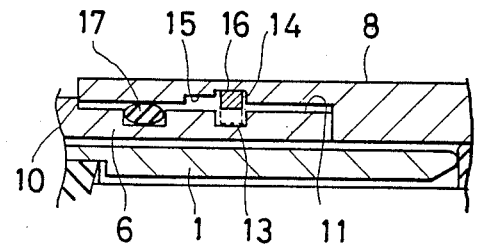
FIG. 3 is an enlarged fragmentary cross-sectional view of the pipe joint, showing the parts position when a pipe is disconnected.
Figure 4:
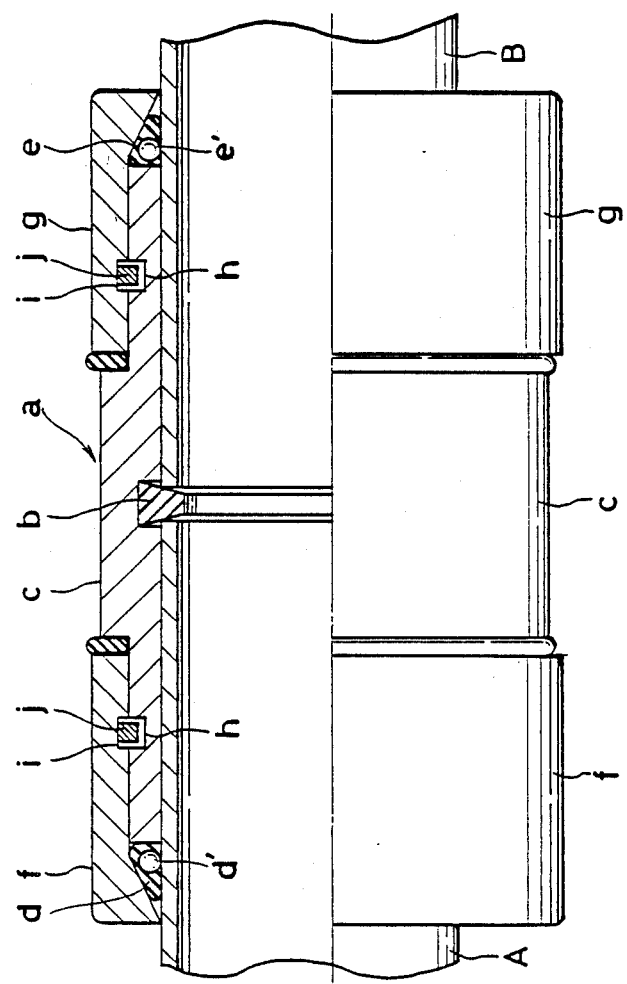
FIG. 4 is a fragmentary cross-sectional view of a conventional pipe joint.

The end of the socket 8 fitted over the joint body 6 has a smaller-diameter annular recess 15 defined in an entire inner peripheral surface thereof. The recess 15 provides a space into which the spring 14 can partly project in radial confronting relation to the positioning groove 13 when the socket 8 is axially moved over the socket holder 11 until the socket 8 abuts against the positioning member 12. The inner peripheral surface of the socket 8 also has a larger-diameter annular recess 16 contiguous to the smaller-diameter annular recess 15. The recess 16 provides a space into which the spring 14 can be resiliently displaced out of the groove 13 when the recess 16 is positioned in radial alignment with the groove 13, as shown in FIG. 3. A packing member 17 is disposed around the socket holder 11 between the step 10 and the recess 13.

Figure 2:
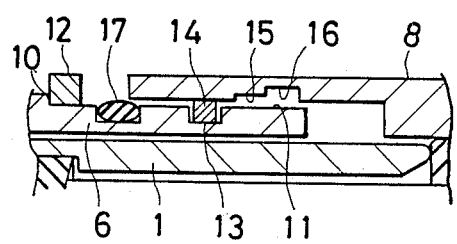
FIG. 2 is an enlarged fragmentary cross-sectional view of the pipe joint, showing the parts position prior to connection a pipe.

For coupling the pipes A, B to each other, the socket 8 is fitted over the socket holder 11 and axially moved toward the positioning member 12, as shown in FIG. 2. the spring 14, disposed in the positioning groove 13, resiliently projects partly into the smaller-diameter recess 15 and engages therein to retain the socket 8 on the joint body 6 against removal, as shown in FIG. 1. At this time, the packing members 3, 4 on the opposite ends of the retainer 1 are clamped by the ends of the retainer 1 and the smaller-diameter portions 7, 9. For disconnecting the pipes A, B from each other, the positioning member 12 is removed from the socket holder 11, and the socket 8 is axially moved toward the step 10, as shown in FIG. 3. When the larger-diameter recess 16 is axially aligned with the groove 13, the spring 14 is resiliently displaced out of the groove 13 into the recess 16, thus disengaging the socket 8 from the joint body 6. The socket 8 is then axially removed from the joint body 6.

In the above embodiment, the positioning member 12 can easily be attached and detached since it comprises a pair of C-shaped rings. The spring 14, which also comprises a pair of C-shaped rings, can easily be mounted in the positioning groove 13, and allows reliable connection between the joint body 6 and the socket 8.

With the arrangement of the present invention, as described above, the socket 8 can be joined to the joint body 6 simply by axially moving the socket 8 over the joint body 6, and can be released from the joint body 6 simply by removing the positioning member 12 and moving the socket 8 toward the step 10 a small distance. Therefore, the pipes A, B can easily be connected to and disconnected from each other. Since the pipes A, B are joined to each other by a single operation to connect the joint body 6 and the socket 8, the pipes A, B can smoothly be coupled to each other even if they are somewhat out of axial alignment with each other.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pipe joint comprising:
   a retainer having opposite open ends;
   a seal member mounted within said retainer for positioning pipes inserted through said open ends by abutting against the pipes;
   annular packing members disposed at opposite ends of said retainer and adapted to be fitted over the pipes, respectively;
   a joint body fitted over said retainer and adapted to extend axially from one of the pipes to the other pipe, said joint body having an inner surface for pressing one of said packing members against one of the ends of said retainer;
   a socket holder formed on and around an end of said joint body remote from said inner surface, said socket holder having a peripheral step and a positioning groove defined in a peripheral surface thereof;
   a positioning member removably disposed along said step;
   a spring disposed in said positioning groove and normally urged to move radially outwardly; and
   a socket fitted over said socket holder and adapted to be disposed around the other pipe, said socket being movable toward said joint body and having an inner surface for pressing the other packing member against the other end of said retainer, said socket having defined in an inner peripheral surface a smaller-diameter annular recess for allowing said spring to be resiliently displaced partly into said smaller-diameter annular recess while partly remaining in said positioning groove when said socket is moved toward said joint body into abutment against said positioning member, and a larger-diameter annular recess disposed contiguous to said smaller-diameter annular recess for allowing said spring to be displaced fully out of said positioning groove when said positioning member is removed and said socket is moved toward said step.

2. A pipe joint according to claim 1, wherein said spring comprises a pair of C-shaped rings.

3. A pipe joint according to claim 1, wherein said positioning member comprises a pair of C-shaped rings.

4. A pipe joint according to claim 1, wherein said positioning groove extends around the entire periphral surface of said socket holder.

5. A pipe joint according to claim 1, wherein said retainer, joint body and socket are tubular.

* * * * *